United States Patent
Shah et al.

(10) Patent No.: US 6,475,552 B1
(45) Date of Patent: Nov. 5, 2002

(54) POLYMERIZATION OF MONO AND DISACCHARIDES USING LOW LEVELS OF POLYCARBOXYLIC ACIDS

(75) Inventors: Pankaj Shashikant Shah, Terre Haute, IN (US); Stuart Andrew Shaw Craig, Somers, NY (US); Christina Sue Morrill, Terre Haute, IN (US); Michael Torrey Wuesthoff, Gales Ferry, CT (US)

(73) Assignee: Danisco Finland Oy (FI)

( * ) Notice: Subject to any disclaimer, the term of this patent is extended or adjusted under 35 U.S.C. 154(b) by 0 days.

(21) Appl. No.: 09/398,882

(22) Filed: Sep. 20, 1999

Related U.S. Application Data

(63) Continuation of application No. PCT/US98/05467, filed on Mar. 19, 1998, which is a continuation of application No. 08/820,115, filed on Mar. 19, 1997, now abandoned.
(60) Provisional application No. 60/073,067, filed on Jan. 30, 1998.

(51) Int. Cl.$^7$ .......................... A23G 3/00; C08B 30/00; C13J 1/06
(52) U.S. Cl. .......................... 426/658; 536/1.11; 127/34; 127/46.2
(58) Field of Search .......................... 426/658; 536/1.11; 127/34, 46.2

(56) References Cited

U.S. PATENT DOCUMENTS

| | | | | |
|---|---|---|---|---|
| 2,436,967 A | * | 3/1948 | Leuck | 260/209 |
| 2,719,179 A | * | 9/1955 | Mora et al. | 260/209 |
| 3,486,469 A | * | 12/1969 | Recas | 426/516 |
| 3,766,165 A | * | 10/1973 | Rennhard | 260/209 |
| 3,876,794 A | * | 4/1975 | Rennhard | 426/152 |
| 4,728,526 A | * | 3/1988 | Avera | 426/633 |
| 4,948,596 A | * | 8/1990 | Bunick et al. | 426/3 |
| 4,956,458 A | * | 9/1990 | Luo et al. | 536/112 |
| 5,051,500 A | * | 9/1991 | Elmore | 536/50 |
| 5,091,015 A | * | 2/1992 | Bunick et al. | 127/30 |
| 5,424,418 A | * | 6/1995 | Duflot | 536/103 |
| 5,493,014 A | * | 2/1996 | Caboche | 536/103 |
| 5,573,794 A | * | 11/1996 | Duflot | 426/48 |
| 5,601,863 A | * | 2/1997 | Borden et al. | 426/548 |
| 5,645,647 A | * | 7/1997 | Guzek et al. | 127/30 |
| 5,667,593 A | * | 9/1997 | Guzek et al. | 127/30 |
| 5,728,397 A | * | 3/1998 | Fuisz | 424/439 |

FOREIGN PATENT DOCUMENTS

| | | |
|---|---|---|
| CA | 2086207 | 9/1993 |
| WO | 92/14761 | 9/1992 |

OTHER PUBLICATIONS

O.R. Fennema, Food Chemistry (2$^{nd}$ ed.), Marcel Dekker, Inc., NY 1985, p. 98.
Figdor, S.K., and Bianchine, J.R., J. Agric. Food Chem. 31:389–393 (1983).
B.F.M. Kuster, Starch/Starke, vol. 42 pp. 314–321 (1990).
W. Pigman, The Carbohydrates, Chemistry, Biochemistry, and Physiology (Acadamic Press, NY, 1957, pp. 57–60.
W. Pigman and D. Horton, The Carbohydrates, Chemistry and Bilchemistry (Academic Press, NY, 1972, vol. 1A, pp. 175–186 and vol. IIA, p. 95.

\* cited by examiner

*Primary Examiner*—Nina Bhat
(74) *Attorney, Agent, or Firm*—Ware Fressola Van Der Sluys & Adolphson

(57) ABSTRACT

Superior quality, clean-tasting food grade polydextrose is prepared by reacting glucose or glucose-containing materials such as hydrolyzed starch with a polyol such as sorbitol in the presence of low levels of a polycarboxylic acid such as citric acid. In one embodiment, polydextrose is prepared by reacting glucose or glucose-containing materials such as hydrolyzed starch with a polyol such as sorbitol in the presence of low levels, i.e., from about 0.03% to about 0.1% citric acid at a temperature of from about 145 to about 185 C., preferably from about 150 C. to about 160 C. Because of the low levels of catalyst used in preferred embodiments, minimal or no off-flavors and little color are formed during the course of the reaction, but the product may be purified using ion exchange, membrane filtration, or carbon treatment, or further modified by hydrogenation if desired for certain applications.

14 Claims, No Drawings

POLYMERIZATION OF MONO AND DISACCHARIDES USING LOW LEVELS OF POLYCARBOXYLIC ACIDS

This application is a continuation of PCT/US98/05467 filed Mar. 19, 1998 which is a continuation of Ser. No. 08/820,115 which claims benefit under 35 U.S.C. 119(e) of Provisional Application 60/073,067, filed Jan. 30, 1998.

TECHNICAL FIELD

This invention relates to the polymerization of glucose and other monosaccharides using low levels of a polycarboxylic acid, such as citric acid, to yield edible materials particularly suitable for food use.

With increased consumer demand for healthy, reduced-calorie food products, polymerized carbohydrate materials such as polydextrose have gained popularity in recent years as substitutes for conventional sweeteners, flour, and other starches in recipes, and as fat-sparing agents. Reduction of caloric density in food products using polydextrose, for example, can be significant because polydextrose delivers only about 1 kcal/gram, which is about 25% the value of glucose and 11% the value of fat (Figdor, S. K., and Bianchine, J. R., *J. Agric. Food Chem.* 1983, 31: 389–393). Yet polydextrose is a tasteless, nonsweet bulking agent that can add the mouthfeel, texture, and palatability of higher calorie carbohydrates to food without affecting the utilization of vitamins, minerals or essential amino acids that has plagued the use of some other sugar and fat replacers. In addition, in dental tests, polydextrose does not promote tooth decay or plaque formation, so it can be used in reduced-cariogenic confectioneries and the like. Use of polydextrose and related polysaccharides in food products to totally or partially replace higher calorie ingredients, and to augment artificial sweeteners replacing sugars, permit a dietetic food to retain its appetizing physical appearance, while contributing to the texture and eating quality of the food. (For a review of polydextrose, see Murray, P. R., in Birch, G. G., and Lindley, M. G., pages 84–100.)

Water-soluble, highly branched polydextrose is now widely used as a bulking agent, formulation aid, humectant, and texturizer in frozen dairy compositions such as ice cream, iced milk, and other desserts; in baked goods such a cakes, cookies and pastries containing flour, and in baking mixes; and in icings, candy, syrups, toppings, sauces, gelatins, puddings, beverages, and chewing gum.

Background of the Invention

Glucose is known to polymerize under acidic catalysis. Mora, for example, described the preparation of branched-chain carbohydrate polymers in U.S. Pat. No. 2,719,179. His process involved holding a saccharide or a mixture of saccharides in an inert solvent or diluent in the presence of a Lewis acid catalyst at a temperature of −80 C. to 110 C. He suggested that hydrochloric acid, phosphoric acid, phosphorous acid, sulfuric acid, aluminum chloride, zinc chloride, stannic chloride, boron trifluoride, antimony trichloride, or p-toluene sulfonic acid might be useful for the practice of his invention, although his examples employ only hydrochloric acid to polymerize dextrose.

Under acidic conditions at elevated temperatures, carbohydrates, especially monosaccharides, are vulnerable to a variety of reactions, including hydrolysis, dehydration, decomposition, and polymerization. Products, which tend to have yellow to brown colors and caramel-like odors, are complex mixtures of anhydro sugars, hydroxymethyl furfural and other furan compounds, levulinic acid, formic acid, soluble polymers, and insoluble humins. These reactions are described, for example, in W. Pigman, *The Carbohydrates, Chemistry, Biochemistry, and Physiology* (Academic Press, New York, 1957, pages 57 to 60); in W. Pigman and D. Horton, *The Carbohydrates, Chemistry and Biochemistry* (Academic Press, New York, 1972, volume IA, pages 175 to 186, and volume IIA, page 95); in O. R. Fennema, *Food Chemistry* (2nd ed., Marcel Dekker, Inc., New York, 1985, page 98); and in B. F. M. Kuster, Volume 42 of *Starch Starke* (1990, pages 314–321). These reactions are difficult to control during acid-catalyzed polymerization of saccharides, where the object is a polymer having bland taste and low color.

In U.S. Pat. No. 2,436,967, Leuck described a series of experiments comparing catalysts or combinations of catalysts for the polymerization of sugar, preferably in a molten state. He found that alkaline salts could not be effectively used because they had a tendency to break down or destroy the dextrose, and that neutral salts were more effective than an acid as a catalyst for polymerization. He reported that, as a general rule, neutral salts gave larger amounts and higher degrees of polymerization than acids or acid salts, and have a further advantage in that they do not bring about as much color formation per unit of time or per unit of temperature as do acids or acid salts.

Rennhard reviewed the disadvantages of using mineral acid to promote polymerization of sugars to produce edible products in U.S. Pat. Nos. 3,766,165 and 3,876,794. Polysaccharides made from their constituent mono- or disaccharides using these acid catalysts were typically dark-colored and off-flavored. In addition to the carmelization and/or browning observed, mineral acids tend to catalyze the reverse reaction, depolymerization, forming acid reversion products that cut down on the efficiency of the forward reaction. Moreover, for food use, inedible catalysts, solvents and the like used in the preparatory procedures must be substantially completely removed from the products formed in the polymerization, and in some cases this was not possible as, for example, where the catalysts formed complexes with the products.

Rennhard proposed that mineral acids be replaced with non-volatile, edible organic polycarboxylic acids for the manufacture of polysaccharides for food use. He tested a variety of these acids as catalysts and cross-linking agents for the polymerization of glucose and maltose and found that the best products were obtained if the reaction were carried out in a melt at reduced pressure. He found that superior products could be obtained if he included a food acceptable polyol such as sorbitol in the saccharide-carboxylic acid reaction mixture prior to polycondensation. In addition, he reported that, by adjustment of the initial acid concentration, the reaction duration, and reaction temperature, two types of polyglucose and polymaltose, soluble and insoluble, could be obtained simultaneously or separately.

Rennhard's use of food grade citric acid to make polydextrose eventually became a process identified by the Food and Drug Administration as safe (21 C.F.R. 172.841). The process, however, had its limitations for the production of desirable food grade material. To achieve an acceptable degree of polymerization, at least about 1% by weight citric acid was typically employed. Polydextrose prepared using these levels possessed a slightly bitter taste which limited its utility in many food products, as many subsequent disclosures were directed toward taste improvement. In U.S. Pat. No. 4,622,233 to Torres, for example, anhydroglucose (thought to contribute to the bitter taste), other impurities, and some color were removed from the polydextrose by treatment with a solvent and a food-approved bleaching agent. U.S. Pat. Nos. 4,948,596 and 4,956,458 to Bunick, et al., and Luo, et al., respectively disclosed purification of polydextrose by solvent extraction and reverse osmosis. In U.S. Pat. Nos. 5,645,647 and 5,667,593, Guzek, et al., disclosed an ion exchange process for purification of polydextrose, and employed the method to remove bound citric acid to levels below 0.3 mole %. A polydextrose having improved color, flavor, and decreased reactivity toward food ingredients having an amine functionality was prepared by hydrogenating the polymer product to remove reducing glucose groups (U.S. Pat. No. 5,601,863 to Borden, et al.).

Because consumer interest in reduced- and low-calorie food and beverage products is growing, it would be desirable to have alternate processes for economically producing good quality food grade polydextrose using other procedures.

SUMMARY OF THE INVENTION

It is an object of the invention to provide an improved process for the preparation of food grade polysaccharides, particularly a process for the production of edible polydextroses using low amounts of polycarboxylic acids.

It is a further and more specific object of the invention to provide a process for the production of edible polydextrose using very low levels of citric acid.

It is an additional object of the invention to provide in some embodiments processes for modifying and or further purifying polydextrose and other polysaccharides prepared using low level polycarboxylic acid catalysis.

These and other objects are achieved by the present invention which provides a process for preparing highly branched polysaccharides by reacting a saccharide such as maltose, glucose, or a glucose-containing material such as hydrolyzed starch in the presence of a polyol such as sorbitol, glycerol, erythritol, xylitol, mannitol, galactitol, or mixtures thereof, typically at a level of from about 5% to about 20% polyol, in the presence of a sufficient amount of polycarboxylic acid catalyst, to form a polysaccharide suitable for food use, i.e., exhibiting low color and a low level of off-flavors. In most embodiments, the process of the invention utilizes from about 0.001% to about 0.3%, preferably from about 0.04% to about 0.01%, of a polycarboxylic acid catalyst such as citric, maleic, malic, glutaric, ascorbic, erythorbic, fumaric, tartaric, succinic, adipic, itaconic, or terephthalic acids, or an anhydride such as maleic, succinic, adipic, or itaconic acid anhydride, or a mixture of these acids and/or anhydrides. In one embodiment, the catalyst comprises from about 0.04% to about 0.10% by weight citric acid. The product so formed may be neutralized, further purified by ion exchange, membrane filtration, size exclusion chromatography, enzyme treatment and/or carbon treatment, and/or modified by hydrogenation. In some embodiments, the ion exchange purification step involves use of basic anion exchange or mixed-bed resins.

DETAILED DESCRIPTION OF THE INVENTION

This invention is based upon the finding that food grade polydextrose having desirable characteristics can be prepared using low levels of polycarboxylic acid catalyst, yielding a product that in some embodiments exhibits taste characteristics superior to conventional polydextrose made with higher amounts of the same organic acids.

In the practice of the invention, edible polysaccharides are prepared by reacting a polyol with a sugar or sugar-containing materials in the presence of a a polycarboxylic acid or a polycarboxylic acid mixture. Polyols include, but are not limited to, sorbitol, glycerol, erythritol, xylitol, mannitol, galactitol, and mixtures thereof; sorbitol is preferred in some embodiments. Typical embodiments utilize a polyol or polyols that are anhydrous, hydrated, or an aqueous solution. From about 5% to about 20% by weight, preferably from about 5% to about 15% by weight, polyols are typically employed in the reaction mixture. Some embodiments employ from about 8% to about 12% by weight polyols. (Unless otherwise indicated, all percentages given herein are by weight, and are based on the weight at the particular stage of processing being described.)

Sugars include glucose, maltose, other simple sugars, glucose- and maltose-containing materials such as hydrolyzed starch, and mixtures thereof. In typical embodiments, the saccharide is anhydrous, hydrated or an aqueous solution. An advantage of the invention is that polysaccharides exhibiting slightly different properties can be obtained by varying the sugar component. As used herein, the terms polyglucose, polydextrose, polymaltose, and polysaccharide are intended to denominate polymeric materials in which the majority of the monomeric moieties are glucose, maltose, or other saccharide, as well as polymeric materials in which some of the glucose, maltose or other saccharide moieties are esterified with moieties derived from the polymerization activator.

In the practice of the invention, sugar and polyol are reacted together in the presence of an amount of a polycarboxylic acid, or a mixture thereof, sufficient to form a polysaccharide suitable for food use, i.e., one that has low color and a low level of off-flavors. Typically, the amount of catalyst ranges from about 0.001% to about 0.3% by weight, preferably between about 0.05 and 0.1% by weight of acid or an acid mixture. One embodiment, for example, employs between about 0.03% and about 0.1% citric acid. At higher than the optimal acid concentrations, the reaction mixture often produces products that are excessively colored and off-flavored; use of lower than optimal concentrations may not reach an acceptable degree of polymerization. Optimal acid concentrations have the further advantage of providing product containing a minimal amount of catalyst, which eliminates or simplifies further purification steps.

Polycarboxylic acids useful in the process of the invention are preferably non-volatile and edible and include, but are not limited to, citric, maleic, malic, glutaric, ascorbic, erythorbic, fumaric, tartaric, succinic, adipic, itaconic, and/or terephthalic acids, or mixtures thereof. Alternatively, an anhydride such as maleic, succinic, adipic, and/or itaconic acid anhydride may be employed, or mixtures of these with each other or with polycarboxylic acids may be employed. Citric acid is used in one embodiment.

Minimal levels are preferred so that the product does not require extensive purification, but the level must be adequate to promote the reaction. Surprisingly, very low acid levels have been found operable, e.g., levels well below the 1% currently employed in most commercial polydextrose manufacture. These levels give acceptable reaction rates while minimizing dark colors, off-flavors, and acidity of products, and products can, if desired, be used directly in food without purification. As mentioned above, levels between about 0.05% and 0.1% are particularly preferred. Alternatively, polydextrose made with higher levels can be purified by ion exchange, membrane filtration, or carbon treatment.

The reaction is typically carried out in an anhydrous melt. Dry powdered glucose or maltose, for example, are combined with the proper amount of acid, and the reactants are heated under reduced pressure. The duration of the reaction and the reaction temperature are interdependent variables in the practice of the invention. Preferred reaction temperatures vary from about 120 to about 200 C., preferably from about 130 to about 170 C., more narrowly between about 150 to about 160 C. The precise temperature for the anhydrous melt polymerization depends on the initial ratio of glucose, maltose or other sugars to the acid which is used, the reaction time, and the proportion of soluble polysaccharides to insoluble cross-linked polysaccharides which is desired in the final product mixture.

Alternatively, reactants may initially be hydrated or in aqueous solution. In this case, water is typically removed from the reaction mixture by distillation at reduced pressure to promote the polymerization reaction.

The thermal exposure (reaction time and temperature) used in the production of polysaccharides according to the invention should be as low as possible, since discoloration, carmelization and degradation increase with prolonged exposure to high temperature. Fortunately, however, as the temperature of the polymerization is increased, the time required to achieve substantially complete polymerization decreases.

Preferred pressures do not exceed about 300 mm, e.g., from about $10^{-5}$ to 100–300 mm Hg, and can be obtained by use of a vacuum pump, a steam ejector, an aspirator or by other means. The vacuum is employed to exclude air from the polymerization and to remove the water of hydration and the water liberated in the polymerization reaction. The exclusion of air also minimizes decomposition and discoloration of the polysaccharides formed in the polymerization. A nitrogen purge may also be employed to exclude air.

The reaction product formed is a polysaccharide such as polymaltose or polydextrose. By "polydextrose" is meant glucose thermally polymerized in the presence of an acid that functions as a catalyst and a polyol that functions as a plasticizer and chain terminating agent. Polydextrose is a water-soluble, randomly bonded condensation polymer of glucose, containing minor amounts of bound sorbitol and, if citric acid is used as a catalyst, citric acid. Polydextrose is composed almost entirely of randomly cross-linked glucose polymers with all types of glucosidic bonds, the 1–6 bond predominating, and it contains some sorbitol end groups. Along with the polymer itself, it may also contain small amounts of residual starting materials and their reaction products.

After the reaction is complete, the reaction mixture may be neutralized using small amounts of base. Though an advantage of the invention is that low amounts of acid are employed, so that further purification is not required in some embodiments, neutralization of polyglucoses or polymaltoses may be desirable for certain applications, despite the very low levels of acid catalyst which are employed. For example, where the polyglucoses are to be used in dietetic food containing whole milk, excess acid may tend to curdle the milk. Neutralization may be accomplished by adding alkaline substances such as carbonates or hydroxides of potassium, sodium, calcium, or magnesium to the polysaccharide or to an aqueous solution of the polysaccharide. Other materials which may be used to neutralize polyglucose or polymaltose include 1-lysine, d-glucosamine, N-methyl glucamine and ammonium hydroxide. Other methods for reducing the acidity of polyglucose or polymaltose solutions are dialysis, ion exchange, and reverse osmosis.

The polysaccharide formed may be purified using ion exchange, membrane filtration, size exclusion chromatography, carbon treatment, enzyme treatment, bleaching, solvent extraction, or the like, or more than one treatment. Single treatments such as treatment with an anion exchange or a mixed-bed resin, are preferred for economic reasons. Soluble polyglucoses and polymaltoses, for example, may be decolorized by contacting an aqueous solution of the polysaccharide with activated carbon or charcoal. The polysaccharide may also be extracted with ethanol or methanol. Alternatively, the polysaccharide may be bleached. For example, polydextrose may be bleached using hydrogen peroxide (e.g., using 10 mg $H_2O_2$/gram polydextrose) or chlorine dioxide (e.g., using 0.5 mg $ClO_2$/gram polydextrose).

Ion exchange purifications are preferred in some embodiments and include, but are not limited to, slurrying the polydextrose with a resin or resin mixture, or by passing a polydextrose solution through a resin column. Preferred resins include anion exchange resins (either weakly basic or strongly basic), cation exchange resins or mixed-bed resins comprising an anion exchange resin and a cation exchange resin. Generally, for ion exchange purification, the polydextrose concentration is in the range of from about 10% to about 70%, temperature is in the range of about from 10 to about 80 C., the flow rate is in the range of about 0.1 to about 10 bed volumes per hour, and the pressure is in the range of about 1 to 10 atmospheres. For some resins, upper limits of temperature and pressure below the above-described limits may be needed to avoid chemical or physical decomposition of the resins. Preferred resins are employed in ion exchange purifications conducted at room temperature and atmospheric pressure. Ion exchange resin treatment removes the acid catalyst, some colored by-products and some off-flavors.

In some embodiments, ion exchange treatment of low acid-catalyzed polydextrose leads to lower scores for undesirable organoleptic attributes. A decrease in bitterness observed for low acid-catalyzed polydextrose is particularly noteworthy, since the importance of removing bitterness from polydextrose made using higher amounts of catalyst is well known. It is an advantage of the invention that polydextrose prepared according to a method of the invention can provide a product exhibiting a bland taste and light color. It is another advantage of the invention that use of a weakly basic anion exchange resin purification to purify a polydextrose of the invention, for example, can provide a product that exhibits a less sour flavor compared to a polydextrose prepared using conventional means.

Polysaccharides formed by the method of the invention may be further modified. As described above, they may be bleached with sodium chlorite, hydrogen peroxide or other agent used for bleaching flour. Alternatively, they may be hydrogenated as set out in WO 92/14761 referred to above. This typically involves exposing the polydextrose to hydrogen at elevated temperatures and pressures in the presence of a hyrogenation catalyst in a continuous or batch process. For example, a 30% to 60% polydextrose aqueous solution may be hydrogenated in the presence of Raney nickel at a pressure of from about 1000 psi to about 2500 psi and a temperature of from about 100 to about 160 C. for about 30 minutes to about 6 hours. The solution of hydrogenated polydextrose is typically then exposed to a cation exchange resin to remove the dissolved nickel.

Alternatively, polydextrose may be reduced with a hydride donor. For example, polydextrose prepared according to the invention may be reduced in a 30% to 60% aqueous solution having a pH of about 9 to about 12 at an ambient pressure at about 5 to 80 C. for about 30 minutes to 12 hours using sodium borohydride and potassium borohydride as hydride donors. Using either method, the polydextrose is improved for certain purposes because it has substantially no reactive reducing groups that can cause undesirable color and bitter taste.

As a further purification step, unmodified or modified polydextroses of the invention may, in some embodiments, be treated with enzymes to improve color, color stability, taste, viscosity, stability, and the like, as previously described (U.S. Pat. Nos. 5,424,418, 5,493,014, and 5,573,794 to Duflot and Can. Pat. No. 2,086,207 to Caboche). In typical embodiments, the specificity of various bacterial or fungal glycosidases or oxidases are employed either to preferentially cleave bonds found in the unwanted products of side reactions formed during the course of the polymerization reaction, or to remove unwanted low molecular weight products. Typical enzyme purification treatments involve the addition of enzyme to a solution of polysaccharide product followed by an incubation period, or contact of a polysaccharide product solution to enzymes attached to a support. Useful enzymes include, but are not limited to, glucose oxidase, amylase, β-glucosidase, amyloglucosidase, and combinations thereof.

Preferred polydextroses prepared according to a process of the invention exhibit an average molecular weight of from about 1,000 to about 18,000, and exhibit a bland taste, with no after-taste. In some embodiments, the average molecular weight is about 1500. Preferred polydextroses prepared according to the invention exhibit a glucose content of less than about 4.0%, preferably less than about 3.5%, a sorbitol content of less than or equal to about 3%, and an American Public Health Association (APHA) color of about 300 or less, preferably about 200 or less. Especially preferred polydextroses prepared according to the invention exhibit a glucose content of about 3% or less, and an APHA color of about 150 or less. Examples, including those illustrating polydextroses exhibiting an APHA color of about 100, are given hereafter.

It is an advantage of the invention that the degree of polymerization as well as the reaction kinetics can be controlled by changing the ratios of the reactants, reaction time, temperature, and amount of acid catalyst. Optimal levels for bland, nearly colorless polydextrose are given above. Comparative examples illustrating preparations under different conditions are given below.

It is another advantage of the invention that, because the amounts of catalyst consumed are low and the catalyst is inexpensive, the overall process is economical and provides polysaccharides that do not require extensive purification procedures. Yet where polydextrose is prepared, it exhibits little color and fewer off-flavors than what is observed when other catalysts are employed, or what is observed when higher amounts of the same acid or other catalyst are used. Indeed, in some embodiments, the acid level is so low that the products formed using the process can be used without neutralization or other purification procedures.

It is a further advantage of the invention that polydextroses made according to the invention exhibit a taste superior to polydextrose made with higher levels of acid. For example, in studies reported in the Examples below, 20% solutions of polydextrose prepared using 0.05 to 0.1% citric acid catalyst according to the practice of the invention exhibited improved sweetness and fewer off-flavors (e.g., sourness, bitterness, astringency, chemical notes, bite/burn, etc.) than comparable solutions containing conventional polydextrose prepared using 1% citric acid. Yellow cake made using polydextrose prepared with 0.05 to 0.1% polydextrose rated higher in "yellow cake" notes (vanilla and buttery flavors and the like) than did cake prepared using a 1% citric-polydextrose. More specific information is given hereafter.

While not wishing to be bound by theory, it is believed that the perceived enhancements of desirable flavor properties in cake may be the result of diminished masking by the food acid used as catalyst, or its reaction products.

EXAMPLES

The following examples are presented to further illustrate and explain the present invention and should not be taken as limiting in any regard. Unless otherwise indicated, all parts and percentages are by weight and are based at the stage of processing being described, color in a 10% aqueous solution is reported using the American Public Health Association (APHA) scale wherein zero is colorless, molecular weight profiles are estimated using high performance liquid chromatography (HPLC), and taste is reflected in the so-called hedonic test, a common method of measuring food acceptance. The test employs a taste panel, here typically 14 in number. It is a straight acceptance test, and does not necessarily require an experienced panel, but the test results reported herein employ a trained panel. Panelists are given coded samples to rate for acceptance by checking a point on a scale from 1–9; at the same time, panelists are given a space to provide additional comments. In comparative tests generally employed herein, pairs of coded samples, one containing conventional polydextrose made with 1% citric acid and one containing polydextrose of the invention prepared using 0.05 to 0.1% citric acid catalyst, are compared side by side.

Example 1

Control

Polydextrose Made Using 1% Citric Acid as Catalyst

A mixture of 445 grams of dextrose monohydrate and 50 grams of sorbitol was melted and heated under partial vacuum, with stirring, to 132 C., and a solution of 5 grams of citric acid in 10 milliliters of water was added. Stirring and heating were continued for another 22 minutes. The final temperature of the reaction mixture was 165 C. The product contained 3.1% residual glucose and had an APHA color of 100 in 10% aqueous solution.

Example 2

Polydextrose Made Using 0.5% Citric Acid as Catalyst

A mixture of 267 grams of dextrose monohydrate and 30 grams of sorbitol was melted and heated under partial vacuum, with stirring, to 132 C., a solution of 1.5 grams of citric acid in 5 milliliters of water was added, the temperature of the mixture was increased to 152 C., and stirring was continued for 10 minutes under partial vacuum at 152–174 C. The product contained 2.6% glucose and had an APHA color of less than 100 in 10% aqueous solution.

Example 3

Polydextrose Made Using 0.3% Citric Acid as Catalyst

A mixture of 267 grams of dextrose monohydrate and 30 grams of sorbitol was melted and heated under partial vacuum, with stirring, to 130 C., a solution of 0.9 gram of citric acid in 5 milliliters of water was added, the temperature of the mixture was increased to 152 C., and stirring was continued for 20 minutes under partial vacuum at 152–190 C. The produce contained 1.2% glucose and had an APHA color of 175 in 10% aqueous solution.

Example 4

Polydextrose Made Using 0.1% Citric Acid as Catalyst

A mixture of 267 grams of dextrose monohydrate and 30 grams of sorbitol was melted and heated under partial vacuum, with stirring, to 130 C., a solution of 0.3 gram of citric acid in 5 milliliters of water was added, the temperature of the mixture was increased to 152 C., and stirring was continued for 22 minutes under partial vacuum at 152–188 C. The produce contained 2.3% glucose and had an APHA color of 125 in 10% aqueous solution.

Example 5

Polydextrose Made Using 0.05% Citric Acid as Catalyst

A mixture of 267 grams of dextrose monohydrate, 30 grams of sorbitol, and 50 milliliters of water was heated under partial vacuum, with stirring, until distillation of water was essentially complete, a solution of 0.15 gram of citric acid in approximately 5 milliliters of water was added, the temperature of the mixture was increased to 152 C., and stirring was continued for 27 minutes under partial vacuum at 152–182 C. The product contained 2.9% glucose and had an APHA color of 125 in 10% aqueous solution.

Example 6

Comparison of Flavor Profiles of Conventional Polydextrose with Polydextrose Made Using Low Levels of Citric Acid Two panels, each having 14 trained panelists, were used to evaluate the flavor profile of 20% solutions of polydextrose prepared with 0.1% citric acid catalyst in a scaled-up preparation like that described in Example 4 above and a 20% solution of Litesse, an ion exchange-purified commercial product manufactured by Cultor, Inc. using 1% citric acid catalyst. In a second study, the panelists evaluated a 20% solution of polydextrose prepared with 0.05% citric acid and a 20% solution of Litesse.

In both studies, samples were served at room temperature to the panelists in coded 50 ml plastic cups. The panelists reported their descriptive perceptions of the following flavor attributes on a scale from 1 to 9: sweet, sour, salt, bitter, astringency, bite/burn, metallic, warming, cooling, numbing, fruity notes, floral notes, green notes, cotton candy flavor, anise notes, musty, caramelized, chemical, other, sweet aftertaste, artificial sweetener aftertaste, and off-notes aftertaste.

In the first study comparing a 20% Litesse solution with a 20% solution containing polydextrose prepared using 0.1% citric acid, the 0.1% citric acid polydextrose rated lower in sour (average value=2.7 for Litesse and 2.0 for 0.1% citric-polydextrose) and numbing (average value=2.0 for Litesse and 1.1 for 0.1% citric-polydextrose) and similar in all other attributes evaluated. In the second study comparing a 20% Litesse solution with a 20% solution of a polydextrose prepared with 0.05% citric acid, the 0.05% citric acid polydextrose rated lower in sour (average value= 2.7 for Litesse and 1.6 for 0.05% citric-polydextrose), metallic (average value=2.5 for Litesse and 1.7 for 0.05% citric-polydextrose) and astringency (average value=3.0 for Litesse and 1.9 for 0.5% citric-polydextrose), and similar in all other attributes evaluated. In the latter study, both sourness and astringency exhibit a significant difference at $p<0.05$.

Both studies were repeated comparing 20% solutions of polydextrose prepared with 1% citric acid catalyst which had not been further purified using ion exchange chromatography with 20% solutions of polydextrose prepared using 0.05% and 0.1% citric acid catalyst, respectively (also not further purified). Compared to a 20% solution of polydextrose prepared using 1% citric acid, the 20% polydextrose solutions prepared with 0.05% and 0.1% citric acid rated higher in sweetness and cotton candy flavor and lower in off-notes (sour, bitter, astringency, bite/burn, chemical, etc.). The average numerical evaluations of the descriptive results exhibiting perceived differences between samples are summarized as follows, using PDX as an abbreviation for polydextrose:

|  | Study 1 | | Study 2 | |
| --- | --- | --- | --- | --- |
|  | 1% citric-PDX | 0.1% citric-PDX | 1% citric-PDX | 0.05% citic-PDX |
| Sweetness | 2.8 | 5.0 | 2.5 | 4.8 |
| Sourness | 6.3 | 2.0 | 5.5 | 1.2 |
| Astringency | 5.0 | 2.3 | 4.4 | 2.5 |
| Bitterness | 3.4 | 1.8 | 2.5 | 1.6 |
| Bite/Burn | 3.0 | 1.4 | 2.3 | 1.2 |
| Green Note | 2.1 | 1.6 | 1.6 | 0.6 |
| Cotton Candy | 0.7 | 1.8 | 0.8 | 1.9 |
| Caramelized | 1.0 | 1.5 | 1.2 | 2.2 |
| Chemical | 4.1 | 2.7 | 3.3 | 2.2 |
| Sweet Aftertaste | 1.5 | 3.8 | 1.6 | 3.0 |
| Art. Sweet Aftertaste | 1.8 | 3.8 | 1.9 | 2.6 |
| Off-Note Aftertaste | 4.6 | 2.5 | 3.5 | 2.6 |

The results show some superior flavor attributes of polydextrose prepared using lower amounts of citric acid as catalyst (i.e., 0.05 to 0.1% rather than what is conventionally employed (i.e., 1%).

Example 7

Comparison of Yellow Cake Containing Conventional Polydextrose and Polydextrose Made Using Low Levels of Citric Acid In this example, the flavor attributes of yellow cake containing polydextrose prepared using 1% citric acid were compared with cakes formulated with the same amount of polydextrose prepared with 0.05% and 0.1% citric acid, respectively, in the same recipe.

Panels of 14 trained panelists each were used to evaluate each group of cake samples as described in Example 6 above. Yellow cake made using polydextrose prepared with 1% citric acid catalyst was compared with yellow cake made using polydextrose prepared with 0.1% citric acid in the first study and with yellow cake made using polydextrose prepared with 0.05% citric acid in the second study. Samples were served to the panelists at room temperature in 100 ml plastic cups. The panelists evaluated, on a scale of 1 to 9, flavor attributes of sweetness, sourness, saltiness, bitterness, astringency, vanilla, fruity/floral notes, diacetyl note, butter notes, milk/dairy notes, eggy flavor, flour/starch flavor, mustiness, other notes, sweet aftertaste, artificial sweetener aftertaste, and off-note aftertaste. Physical properties were also evaluated; these included hardness, cohesiveness, springiness, denseness, and wetness.

The average numerical evaluations of the descriptive results exhibiting perceived differences between cake samples are summarized as follows, using PDX as an abbreviation for polydextrose:

|  | Study 1 | | Study 2 | |
| --- | --- | --- | --- | --- |
|  | 1% citric-PDX | 0.1% citric-PDX | 1% citric-PDX | 0.05% citric-PDX |
| Sourness | 1.6 | 1.0 | 2.0 | 1.6 |
| Fruity/Floral | 1.6 | 2.1 | 1.6 | 2.0 |
| Diacetyl | 3.4 | 4.0 | 2.9 | 3.4 |
| Butter | 1.7 | 2.1 | 1.7 | 2.1 |
| Eggy Notes | 3.0 | 2.9 | 2.7 | 3.4 |
| Off-Note Aftertaste | 2.4 | 2.0 | 2.0 | 1.7 |
| Cake Cohesiveness | 8.4 | 8.7 | 4.3 | 5.7 |
| Cake Wetness | 7.7 | 8.0 | 4.9 | 5.8 |

The cake samples were otherwise perceived as comparable.

It can be seen that in the flavor tests, yellow cake made with 0.05% citric-polydextrose had higher fruity/floral, butter, and eggy evaluations, with cakes rated as having higher "yellow cake" flavor notes. Also cakes made with the polydextrose prepared with the minimum amount of citric acid catalyst (0.05%) were perceived as more moist and cohesive.

Example 8

Comparison of Ranch Dressing Containing Conventional Polydextrose and Polydextrose Made Using Low Levels of Citric Acid Studies like that reported in Example 7 above were repeated using ranch dressing as a food product for comparison purposes. Two studies were conducted, each employing a panel of 14 trained panelists as described in Example 5 above, for comparisons of dressings made using the same recipe but different polydextrose samples. In the first study, samples of dressing formulated with polydextrose prepared with 1% citric acid catalyst were compared with dressing samples containing polydextrose prepared with 0.1% citric acid catalyst. In the second study, samples of dressing formulated with 1% citric-polydextrose were compared with dressing formulated with 0.05% citric-polydextrose.

Attributes evaluated on a scale of 1 to 9 included sweetness, sourness, saltiness, MSG perception, bitterness, astringency, heat/burn, dairy notes, cultured notes, spices, onion/garlic, musty, off-notes, other flavors, total flavor, typical aftertaste, off-note aftertaste, and mouthcoating. Enhanced sweetness (4.6 versus 4.0) was perceived in ranch dressings prepared with 0.05% citric-polydextrose instead of 1% citric-polydextrose. Although differences were not statistically significant, all other favorable flavor attributes were also improved in the polydextrose prepared with low levels of citric acid.

The results show that, in some embodiments, comparable polydextrose suitable for food use can be achieved using significantly less citric acid catalyst during the manufacturing process.

The above description is for the purpose of illustrating and not limiting the present invention, and teaching the person of ordinary skill in the art how to practice the invention. It is not intended to detail all those obvious modifications and variations of it which will become apparent to the skilled worker upon reading the description. It is intended, however, that all such obvious modifications and variations be included within the scope of the present invention as defined in the appended claims. The claims are meant to cover the claimed components and steps in any sequence which is effective to meet the objectives there intended, unless the context specifically indicates the contrary.

The patents and papers cited above are hereby incorporated herein by reference in their entireties.

What is claimed is:

1. A process for preparing an edible polysaccharide comprising reacting a saccharide selected from the group consisting of glucose, other simple sugars, hydrolyzed starch, and mixtures thereof, with 5 to 20 weight % of a polyol selected from the group consisting of sortibol, glycerol, erythritol, xylitol, mannitol, galactitol, and mixtures thereof, under anhydrous melt polymerization conditions at a reduced pressure, in the presence of from 0.001 to 0.3 weight % of an acid or anhydride selected from the group consisting of citric acid, maleic acid, malic acid, glutaric acid, fumaric acid, tartaric acid, succinic acid, adipic acid, itaconic acid, terephthalic acid, maleic acid anhydride, succinic acid anhydride, adipic acid anhydride, itaconic acid anhydride, and mixtures thereof.

2. A method according to claim 1 which is carried out in the presence of from 0.03% to 0.1 weight % polycarboxylic acid or anhydride.

3. A method according to claim 1 wherein the polycarboxylic acid comprises citric acid.

4. A process according to claim 1 wherein the polyol is sorbitol and the saccharide is glucose.

5. A process according to claim 1 wherein the reaction is conducted at a temperature of from 120° to 200° C.

6. A process according to claim 5 wherein the reaction is conducted at a temperature of from 130° to 170° C.

7. A process according to claim 1 wherein the pressure during reaction does not exceed 300 mm Hg.

8. A process according to claim 1 which further comprises a step of neutralizing the edible polysaccharide.

9. A process according to claim 1 further comprising a purification step using a method selected from the group consisting of ion exchange, membrane filtration, size exclusion chromatography, carbon treatment, enzyme treatment, and combinations thereof.

10. A process according to claim 1 further comprising a post-reaction hydrogenation of the polydextrose product formed in the reaction.

11. A process according to claim 1 wherein the edible polysaccharide comprises a polydextrose having a color of 300 or less based on a 10 weight % aqueous solution using the American Public Health Association (AHPA) scale wherein zero is colorless.

12. A process according to claim 11 wherein the edible polysaccharide comprises a polydextrose having a color of 200 or less based on a 10 weight % aqueous solution using the American Public Health Association (AHPA) scale wherein zero is colorless.

13. A process according to claim 1 wherein the polyol, saccharide and edible polycarboxylic acid catalyst are reacted at a temperature of from 120° to 200° C., and under a reduced pressure of less than 300 mm Hg for a period of time so as to result in an edible polysaccharide having an average molecular weight of from 1000 to 18,000 and an AHPA color of 300 or less.

14. A process according to claim 13 wherein the polyol is sorbitol, the saccharide is glucose and the edible polysaccharide is polydextrose.

\* \* \* \* \*